United States Patent
Kandala et al.

(10) Patent No.: US 7,414,986 B2
(45) Date of Patent: *Aug. 19, 2008

(54) SYSTEM AND METHOD FOR CONTROLLING WIRELESS LAN BANDWIDTH ALLOCATION

(75) Inventors: Srinivas Kandala, Vancouver, WA (US); John Kowalski, Camas, WA (US); Yoshihiro Ohtani, Kyoto (JP); Shugong Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 447 days.

This patent is subject to a terminal disclaimer.

(21) Appl. No.: 10/497,573

(22) PCT Filed: Jul. 31, 2003

(86) PCT No.: PCT/US03/24217

§ 371 (c)(1),
(2), (4) Date: Jun. 1, 2004

(87) PCT Pub. No.: WO2004/012493

PCT Pub. Date: Feb. 12, 2004

(65) Prior Publication Data

US 2005/0174973 A1    Aug. 11, 2005

Related U.S. Application Data

(60) Provisional application No. 60/400,511, filed on Aug. 2, 2002.

(51) Int. Cl.
*H04J 3/00* (2006.01)
*H04Q 7/24* (2006.01)
(52) U.S. Cl. .................. 370/310; 370/336; 370/338; 370/345

(58) Field of Classification Search .............. 370/336, 370/338, 329–330, 341, 345–348; 455/450–453
See application file for complete search history.

(56) References Cited

U.S. PATENT DOCUMENTS 5,371,734 A * 12/1994 Fischer ................ 370/311

(Continued)

FOREIGN PATENT DOCUMENTS

WO   WO 0206986   1/2002

OTHER PUBLICATIONS

"802.11 PCF Enhancements and Contention Free Bursts", IEEE Document 802-11-00/113, Maarten Hoeben, May 2000.
"Guaranteed Channel Access Queue State Element and Express Data Traffic". IEEE Document 802.11-01/597r1, Peter Johanssen, Nov. 2001.

*Primary Examiner*—Simon D Nguyen
(74) *Attorney, Agent, or Firm*—Law Office of Gerald Maliszewski; Gerald Maliszewski (57) ABSTRACT

A system and method are provided for controlling bandwidth allocation in a wireless local area network (wLAN). The method comprises: expressing device bandwidth allocations in terms of a time base; in response to expressing the bandwidth allocation in terms of a time base, monitoring network communications; and, measuring the allocated bandwidths. The method may further comprise: establishing polling schedules in response to the time-based bandwidth allocation; and, de-energizing devices in response to the polling schedules. Expressing device bandwidth allocations in terms of a time base includes establishing: an inter-transmission opportunity (TXOP) interval; and, a TXOP jitter. These fields are supplied in the IEEE 802.11e transmit specification (TSPEC). Then, de-energizing devices in response to the polling schedule includes disengaging transmission and receiving functions in the minimum TXOP intervals between polling events, where the minimum TXOP interval is the inter-TXOP interval minus the TXOP jitter.

20 Claims, 5 Drawing Sheets

U.S. PATENT DOCUMENTS

| | | | |
|---|---|---|---|
| 5,751,708 A | 5/1998 | Eng et al. | 370/389 |
| 6,198,728 B1* | 3/2001 | Hulyalkar et al. | 370/310.1 |
| 6,469,991 B1 | 10/2002 | Chuah | 370/329 |
| 6,480,506 B1 | 11/2002 | Gubbi | 370/468 |
| 6,771,661 B1* | 8/2004 | Chawla et al. | 370/468 |
| 7,123,627 B2* | 10/2006 | Kowalski | 370/468 |
| 2002/0093929 A1* | 7/2002 | Mangold et al. | 370/336 |
| 2002/0105970 A1* | 8/2002 | Shvodian | 370/468 |
| 2003/0031208 A1* | 2/2003 | Anehem et al. | 370/474 |
| 2003/0093526 A1* | 5/2003 | Nandagopalan et al. | 709/225 |
| 2003/0198246 A1* | 10/2003 | Lifshitz et al. | 370/445 |
| 2003/0214905 A1* | 11/2003 | Solomon et al. | 370/229 |

* cited by examiner

TR SPECIFICATION (TRS) ELEMENT

| OCTETS: 1 | 1 | 2 | 2 | 2 | 2 | 2 | 2 | 2 |
|---|---|---|---|---|---|---|---|---|
| ELEMENT ID (TBD) | LENGTH (14) | TR INFO | TR ACT-IVATION DELAY | INTER-TXOP INTERVAL | MINIMUM TXOP DURATION | NOMINAL TXOP DURATION | MAXIMUM TXOP DURATION | TXOP JITTER BOUND |

| B0 | B1 B3 | B4 B15 |
|---|---|---|
| DIRECTION | USER PRIORITY | RESERVED |
| 1 | 3 | 12 |

TR INFO FIELD

SYSTEM AND METHOD FOR CONTROLLING WIRELESS LAN BANDWIDTH ALLOCATION

RELATED APPLICATIONS

This application claims the benefit of a provisional application entitled, METHODS AND SYSTEMS FOR ALTERNATIVE TRAFFIC SPECIFICATION PARAMETERS, invented by Ohtani et al., Ser. No. 60/400,511, filed Aug. 2, 2002.

BACKGROUND OF THE INVENTION

1. Field of the Invention

This invention generally relates to IEEE 802.11 communications and, more particularly to a system and method for establishing a time-based bandwidth allocation protocol that, in turn, permits bandwidth monitoring and battery-operated devices to implement power saving cycles between transmissions.

2. Description of the Related Art

As noted in "A Short Tutorial on Wireless LANs and IEEE 802.11 by Lough, Blankenship and Krizman (computer.org/students/looking/summer97/ieee802), the IEEE 802.11 standard places specifications on the parameters of both the physical (PHY) and medium access control (MAC) layers of the network. The PHY layer, which actually handles the transmission of data between nodes, can use either direct sequence spread spectrum, frequency-hopping spread spectrum, or infrared (IR) pulse position nodulation. IEEE 802.11 makes provisions for data rates from 1 Mbps to 54 Mbps, and calls for operation in the 2.4-2.4835 GHz frequency band (in the case of spread-spectrum transmission), which is an unlicensed band for industrial, scientific, and medical (ISM) applications. IEEE 802.11 also makes provision for data rates from 6 Mbps to 54 Mbps, and calls for operation in the 5.2 and 5.8 U-NII (Unlicensed Information Infrastructure) band.

The MAC layer is a set of protocols that is responsible for maintaining order in the use of a shared medium. The 802.11 standard specifies a carrier sense multiple access with collision avoidance (CSMA/CA) protocol. In this protocol, when a node receives a packet to be transmitted, it first listens to ensure no other node is transmitting. If the channel is clear, it then transmits the packet. Otherwise, it chooses a random "backoff factor" which determines the amount of time the node must wait until it is allowed to transmit its packet. During periods in which the channel is clear, the transmitting node decrements its backoff counter. When the channel is busy it does not decrement its backoff counter. When the backoff counter reaches zero, the node transmits the packet. Since the probability that two nodes will choose the same backoff factor is small, collisions between packets are minimized. Collision detection, as is employed in Ethernet, cannot be used for the radio frequency transmissions of IEEE 802.11. The reason for this is that when a node is transmitting it cannot hear any other node in the system which may be transmitting, since its own signal will drown out any others arriving at the node.

Whenever a packet is to be transmitted, the transmitting node first sends out a short ready-to-send (RTS) packet containing information on the length of the packet. If the receiving node hears the RTS, it responds with a short clear-to-send (CTS) packet. After this exchange, the transmitting node sends its packet. When the packet is received successfully, as determined by a cyclic redundancy check (CRC), the receiving node transmits an acknowledgment (ACK) packet. This back-and-forth exchange is necessary to avoid the "hidden node" problem. In the hidden-node situation node A can communicate with node B, and node B can communicate with node C, however, node A cannot communicate node C. Thus, for instance, although node A may sense the channel to be clear, node C may in fact be transmitting to node B. The protocol described above alerts node A that node B is busy, and hence it must wait before transmitting its packet.

Local area networks (LANs) typically use a Carrier Sense Multiple Access (CSMA) scheme, in order to support parameterized Quality of Service (QoS). To support packet transmission meeting requirements for throughput, latency and jitter, the system must be able to allocate time on the channel in such a way that coexistence with CSMA-based transmissions is not greatly affected. Moreover, packet error rates in such systems are typically large if the medium is wireless or power-line based, typically greater than 10%.

Several solutions have been proposed to solve the problem of packet transport meeting parameterized QoS objectives. However, these proposals have been found lacking in one or more aspects. The original drafts of 802.11e included an object called a TSPEC (for Transmission Specification), but no means were provided for specifying an upper bound on channel occupancy required for admission in a given stream. Nor was any means provided for objectively verifying that a request for the transport of packets meeting specific QoS objectives could be met.

In addition, this type of TSPEC is agnostic to the fact that the channel makes errors, and therefore, an over-reservation of bandwidth is generally required. Moreover, this type of TSPEC could not be used with power saving devices, since there was no guarantee of time when a sequence of packets wouldn't be delivered.

Time-based polling techniques have previously been considered. However, no time-based polling techniques have been suggested that guarantee a time when polling does not occur. Moreover, previous time-based polling techniques have failed to considered hybrid coordinator (HC) or access point (AP) negotiation; that the HC/AP must act as coordinator for allocation of time on the channel. Finally, no time-based polling techniques have considered a method for making bandwidth reservations.

It would be advantageous if a time-based polling method could be established between IEEE 802.11e network devices to measure allocated bandwidth.

It would be advantageous if a time-based bandwidth allocation protocol could be established between IEEE 802.11e devices so that battery powered portable units could be de-energized in predictable intervals between communications.

SUMMARY OF THE INVENTION

The present invention simplifies the parameterized QoS transport mechanism of 802.11e communications. The present invention incorporates a reservation mechanism that permits an AP to manage bandwidth, locally. More specifically, a hybrid coordinator (HC), collocated with the AP, provides the polling and scheduling services needed to manage the bandwidth. The format permits polling sequences to be predictably determined, allowing for power savings in the intervals when the devices are not transmitting or receiving polls.

The present invention provides a method for objectively determining scheduled opportunities for transmission (TXOPs) with parameterized QoS packet transport based on channel conditions, and for reporting that to an HC/AP. Further, a method is provided for observing said TXOPs, to verify the interoperability of different vendors' implementations. Finally, the present invention method provides parameterized QoS services that coexist with prioritized quality of service CSMA based traffic, and enable priority differentiation to be maintained, subject to limits on admitted parameterized QoS traffic.

Accordingly, a method is provided for controlling bandwidth allocation in a wireless local area network (wLAN), for example, in an IEEE 802.11e network. The method comprises: expressing device bandwidth allocations in terms of a time base; in response to expressing the bandwidth allocation in terms of a time base, monitoring network communications; and, measuring the allocated bandwidths. Other aspects of the method further comprise: establishing polling schedules in response to expressing the bandwidth allocation in terms of a time base; and, de-energizing devices in response to the polling schedules.

Expressing device bandwidth allocations in terms of a time base includes establishing: an inter-transmission opportunity (TXOP) interval; and, a TXOP jitter. These fields are supplied in the transmit specification (TSPEC) sent in the QoS negotiation process. Then, de-energizing devices in response to the polling schedule includes disengaging transmission and receiving functions in the minimum TXOP intervals between polling events. The minimum TXOP interval is defined as the inter-TXOP interval minus the TXOP jitter.

Additional details of the above-described method and a wLAN system for controlling bandwidth allocation are provided below.

DETAILED DESCRIPTION OF THE PREFERRED EMBODIMENTS

Figure 1:
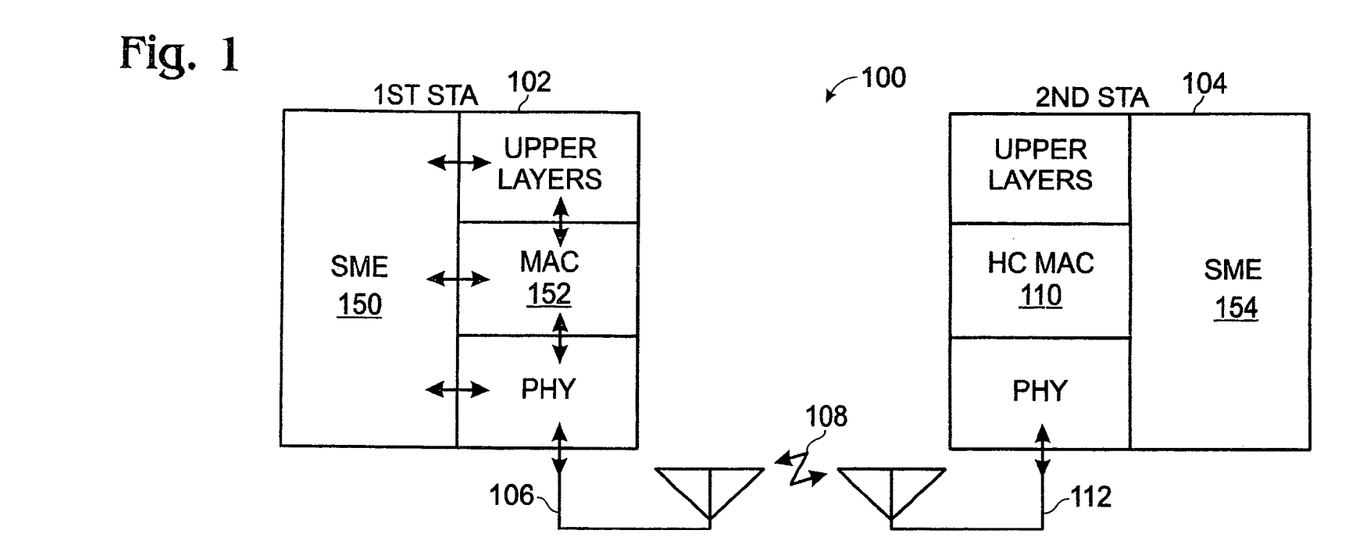
FIG. 1 is a schematic block diagram of the present invention wireless local area network (wLAN) system for controlling bandwidth allocation.

FIG. 1 is a schematic block diagram of the present invention wireless local area network (wLAN) system for controlling bandwidth allocation. The system 100 comprises at least one QoS station (QSTA), referred to herein as a station (STA). Shown are two STAs, a first STA 102 and a second STA 104, however, the system is not limited to any particular number of STAs. Each STA, as exemplified by first STA 102, has a wireless port 106 to communicate information in a bandwidth allocation expressed in terms of a time base. The wireless communication link is represented by reference designator 108. A hybrid coordinator 110 (HC), associated with the second STA 104, has a wireless communications port 112 to monitor the first STA 102 communications and measure the allocated STA bandwidths. The HC may also monitor the second STA 104 transmissions, or other STAs (not shown) that are in communication with either the first STA 102 or the second STA 104.

The HC 110 establishes and transmits polling schedules to the first STA 102, or other STAs (not shown) communicating with the HC 110, responsive to the time-based bandwidth allocation. The first STA 102 de-energizes devices in response to the received polling schedules. More specifically, the first STA 102 communicates in a bandwidth allocation expressed in terms of a time base having an inter-transmission opportunity (TXOP) interval and a TXOP jitter. That is, the time-based polling schedules permit the first STA 102 to determine an inter-TXOP interval and TXOP jitter between scheduled communications.

Figure 2:
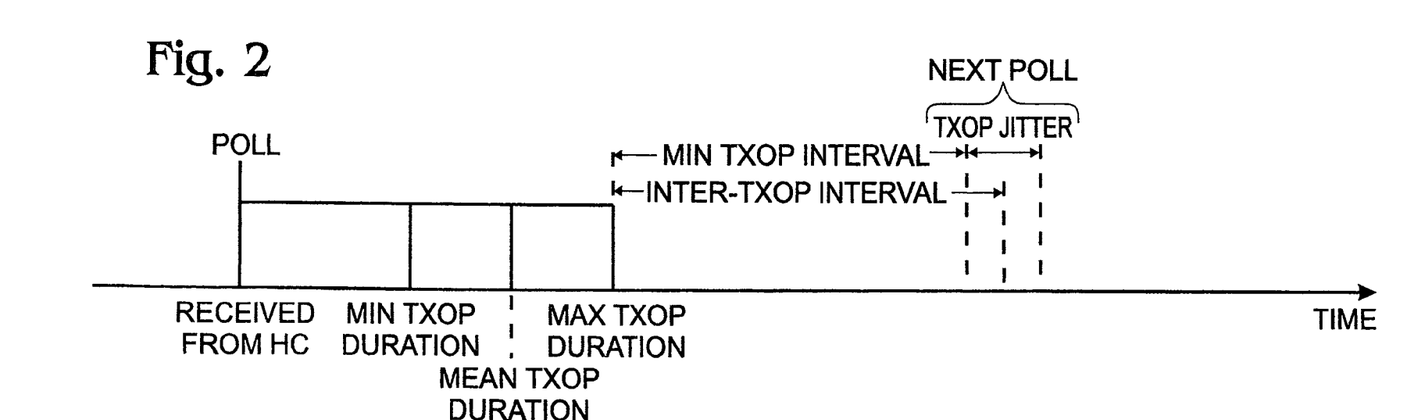
FIG. 2 is a timing diagram depicting time-based events associated with the first STA.

FIG. 2 is a timing diagram depicting time-based events associated with the first STA. Shown is the inter-TXOP interval, or mean TXOP interval between communications, and TXOP jitter, or mean TXOP variance. The first STA communicates in a time base having an inter-TXOP interval and a TXOP jitter, in response to receiving a transmit specification (TSPEC) with inter-TXOP and TXOP jitter fields.

Figure 3:
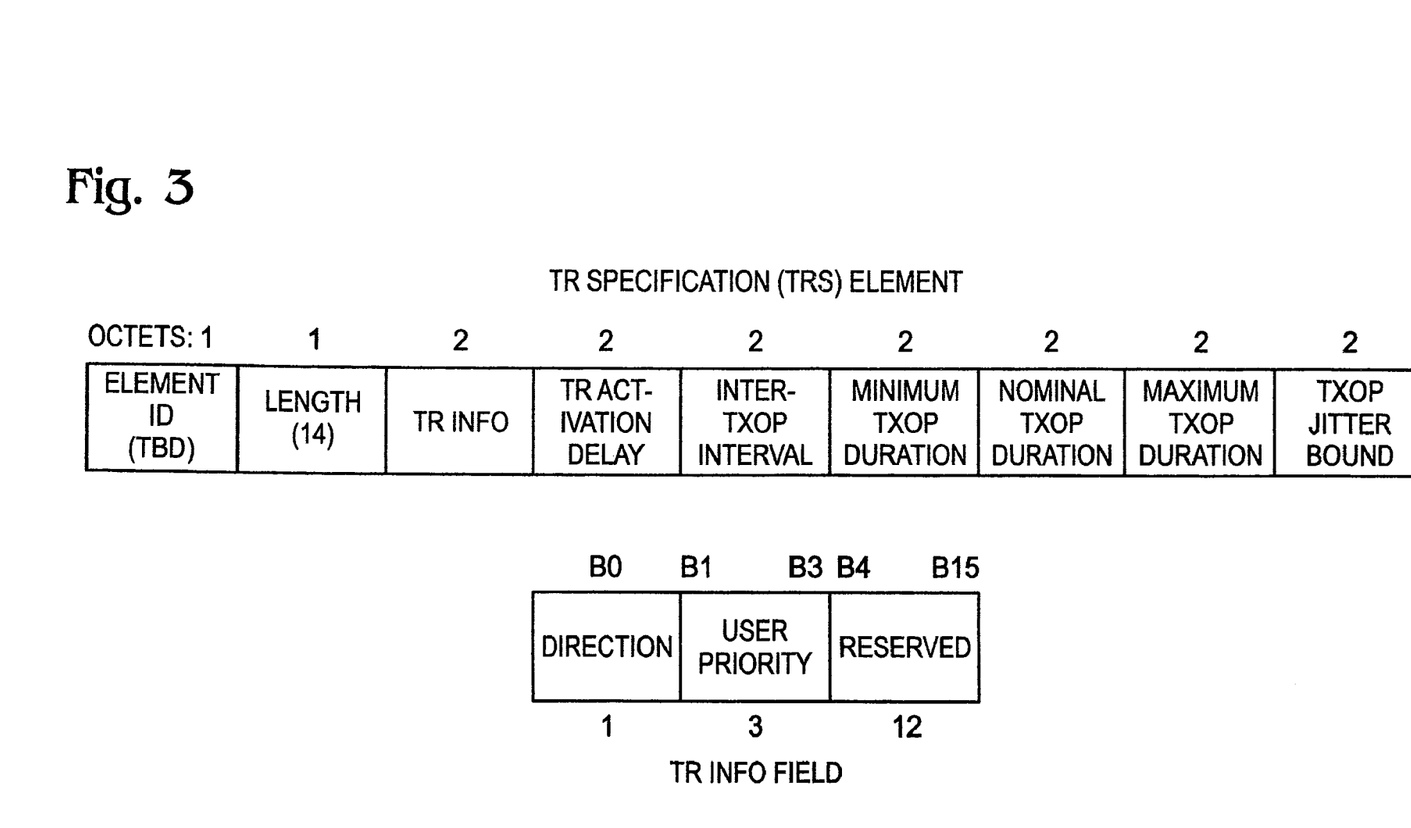
FIG. 3 is a diagram depicting a TSPEC format supportive of the present invention system.

FIG. 3 is a diagram depicting a TSPEC format supportive of the present invention system. Shown are inter-TXOP and TXOP jitter fields. Conventionally, minimum data rate, mean data rate, and maximum burst size fields have been suggested for use in defining the allocated data rate, the TXOP duration, and the latency. However, to support a time-based bandwidth allocation method, the TSPEC element of FIG. 3 shows a minimum TXOP duration field, which replaces the minimum data rate field, a nominal TXOP duration field to replace the mean data rate field, and a maximum TXOP duration field to replace maximum burst size field. The use of time-based fields permits an entity, such as the HC, to actually measure the allocated data rate using the TXOP duration fields. The TXOP interval fields permit the interval between TXOP durations to be predictive, to support power saving functions.

Figure 4:
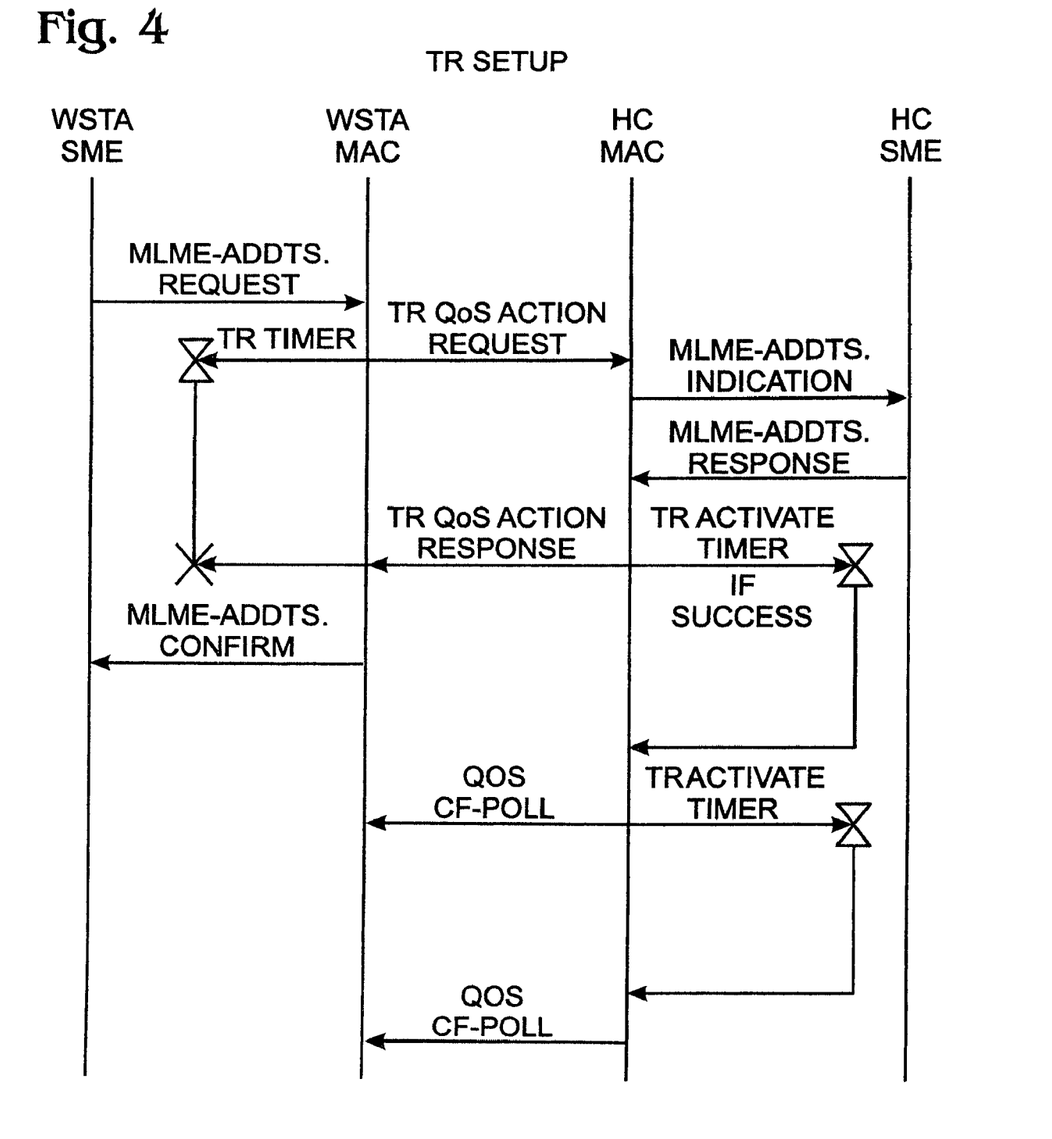
FIG. 4 is a diagram depicting the sequence of messages used in a TR Setup, to request a QoS.

FIG. 4 is a diagram depicting the sequence of messages used in a TR Setup, to request a QoS. Viewing both FIGS. 1 and 4, the first STA 102 requests permission to communicate traffic information at a second bandwidth. The second bandwidth is defined as a desired first bandwidth plus a surplus bandwidth allowance. In other words, a QoS is requested. A first STA station management entity (SME) 150 sends a MLME-ADDTS.request to the first STA MAC 152. The request includes the above-mentioned TSPEC. The first STA MAC 152 generates a frame to support PHY level communications and sends the request to the HC MAC 110 associated with the second STA 104. The HC MAC 110 relays the request from the first STA to the second station SME, sending a MLME-ADDTS.indication primitive to a second STA SME 154. The second STA SME 154 processes the request and transmits a response to the first STA via the HC 110, including an allocation to communicate with the second STA at the second bandwidth. This allocation is more an acknowledgement of the TSPEC request from the first STA. More specifically, the second STA SME 154 generates a MLME-ADDTS-.response. The HC MAC 110 generates the proper frame for communications with the first STA MAC 152, and the first STA MAC 152 sends a MLME-ADDTS.confirm primitive to the first STA SME 150. Once the TSPEC has been confirmed, the second STA SME 154 can initiate polling events.

Returning to FIG. 2, once the TR Setup is established, the first STA transmits traffic information to the second STA at the second bandwidth. That is, the first STA can downlink transmissions to the second STA, or other stations, in the TXOP duration derived with respect to the polling event.

Alternately stated, the HC, in response to establishing a polling schedule, sends a poll to the first STA and the first STA transmits in the TXOP durations derived from the TSPEC. Typically, there is a short inter-frame spacing (SIFS) between the poll and the TXOP duration that is not shown in the figure.

The HC monitors first STA traffic channel TXOP durations, the PHY data rate within the TXOPs, and the intervals between TXOPs, and measures the allocated bandwidth by calculating the ratio of transmitted bits (TXOP duration× PHY data rate) to TXOP intervals. The first STA de-energizes in the TXOP intervals between polling events, and saves power in response to de-energizing. More specifically, the first STA disengages transmission and receiver functions in the minimum TXOP intervals, where the minimum TXOP interval is equal to the inter-TXOP interval minus the TXOP jitter.

Functional Description

In the IEEE 802.11e standard, Quality of Service enhancements are being made that allow for prioritized Quality of Service; i.e., a service that allows connectionless packet data services to be sent at differing priorities. This service permits some packets to be transmitted before other, lower priority, packets, irrespective of when they arrive at the transmitting client. In addition, provisions are being made in the standard to allow a polling service to enable the transmission of parameterized QoS traffic. That is, traffic that must be transmitted subject to constraints on throughput, latency and jitter.

In order to provide both services the following requirements must be met:

1. The parameterized Quality of Service must provide for the fact that the channel is error prone.

2. The parameterized QoS must be observable, and testable, so that scheduled allocations of transmission on the channel ("TXOPs") can be measured and so that equipment can be certified to be interoperable.

3. There must be an admission control mechanism to limit the occupancy of parameterized QoS transport on the channel to maintain prioritized QoS traffic.

4. There must, in scheduling prioritized QoS traffic, be allocated periods of time when transmissions do not happen, so that mobile devices can conserve battery power.

Figure 5A:
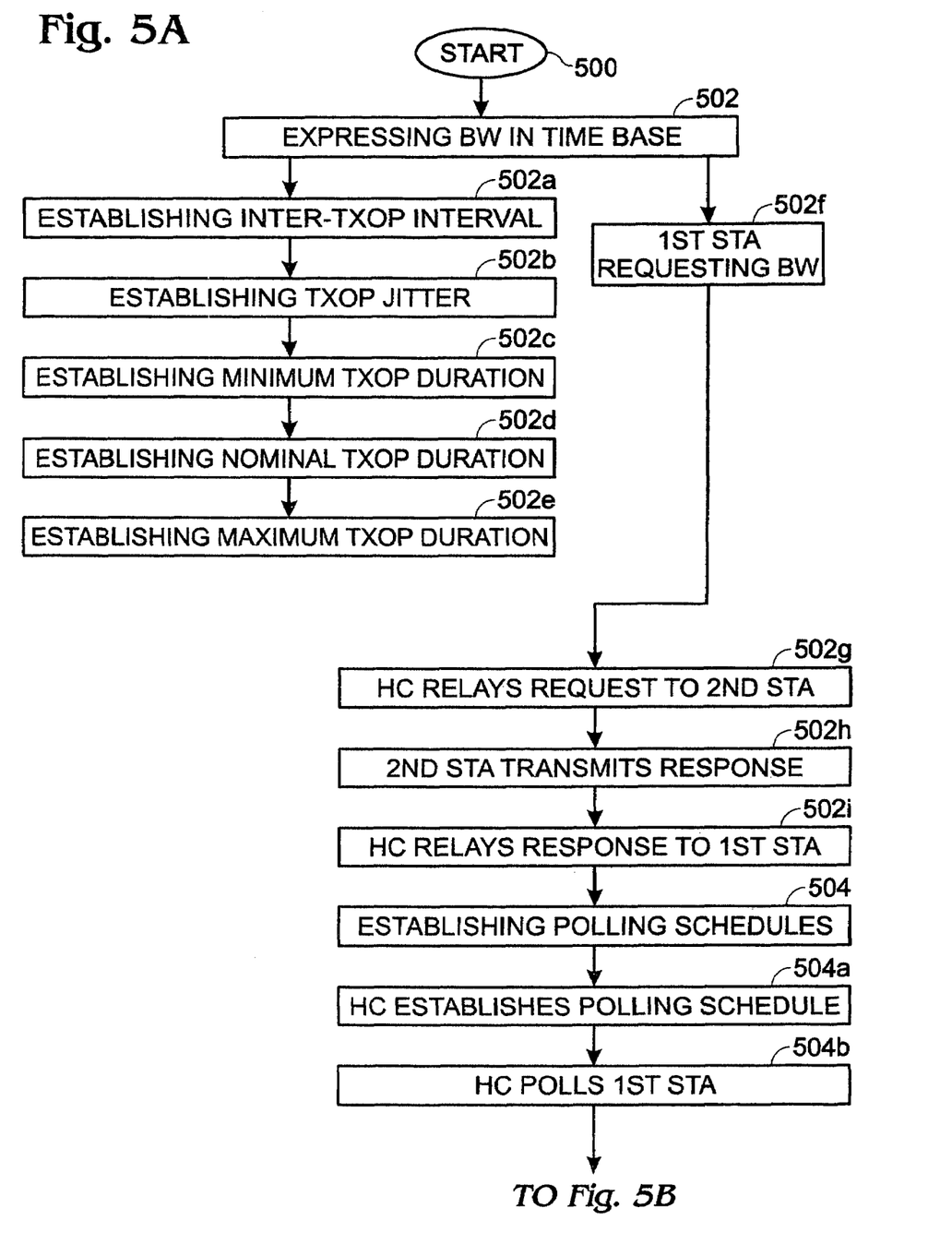
FIG. 5 is a flowchart illustrating the present invention method for controlling bandwidth allocation in a wireless local area network (wLAN).
Figure 5B:
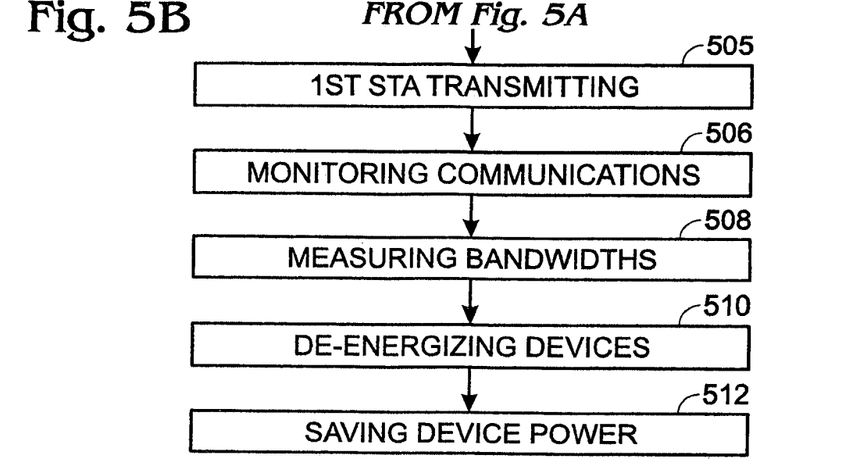

FIG. 5 is a flowchart illustrating the present invention method for controlling bandwidth allocation in a wireless local area network (wLAN). Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 expresses device bandwidth (BW) allocations in terms of a time base. Step 504, in response to expressing the bandwidth allocation in terms of a time base, establishes polling schedules. Step 506, in response to expressing the bandwidth allocation in terms of a time base, monitors network communications. Step 508 measures the allocated bandwidths. Step 510 de-energizes devices in response to the polling schedules.

In some aspects of the method, expressing device bandwidth allocations in terms of a time base in Step 502 includes substeps. Step 502a establishes an inter-transmission opportunity (TXOP) interval. Step 502b establishes a TXOP jitter. Establishing an inter-TXOP interval (Step 502a) and a TXOP jitter (Step 502b) includes establishing (est.) a transmit specification (TSPEC) communication with inter-TXOP interval and a TXOP jitter fields.

In other aspects, expressing device bandwidth allocations in terms of a time base in Step 502 includes additional substeps where a TSPEC communication establishes a minimum TXOP duration field in Step 502c, a nominal TXOP duration field in Step 502d, and a maximum TXOP duration field in Step 502e.

In other aspects the method, expressing device bandwidth allocations in terms of a time base (Step 502) includes additional substeps. In Step 502f, a first station (STA) requests permission to communicate traffic information at a second bandwidth, with a second STA. The second bandwidth is defined as the first (desired) bandwidth plus a surplus bandwidth allowance. As noted above in the explanation of the system, the request is in the form of a TSPEC as defined in Steps 502a through 502e. In Step 502g a hybrid controller (HC) relays the request to the second STA. In Step 502h the second STA transmits a response, which includes an allocation to the first STA allocation to communicate with the second STA at the second bandwidth. In Step 502i, the HC relays the response to the first STA. Then, in Step 505, the first STA transmits traffic information to the second STA through a wireless medium at the second bandwidth.

In other aspects, establishing polling schedules in response to expressing the bandwidth allocation in terms of a time base in Step 504 includes substeps. In Step 504a the HC establishes a polling schedule. In Step 504b the HC sends a poll to the first STA in response to the polling schedule. Then, the first STA transmitting traffic information to the second STA through a wireless medium at the second bandwidth (Step 505) includes the first STA transmitting in the TXOP durations derived from the TSPEC.

In some aspects, monitoring network communications in response to expressing the bandwidth allocation in terms of a time base (Step 506) includes the HC monitoring first STA traffic channel TXOP durations, the PHY data rate within the TXOPs, and the intervals between TXOPs. Then, measuring the allocated bandwidths in Step 508 includes the HC calculating the ratio of transmitted bits (TXOP duration×PHY data rate) to TXOP intervals for the first STA.

In other aspects, de-energizing devices in response to the polling schedule in Step 510 includes de-energizing devices in the TXOP intervals between polling events. Then, the method comprises a further step. Step 512 saves device power in response to de-energizing the devices.

In some aspects, de-energizing the devices in the TXOP intervals between polling events (Step 510) includes the first STA disengaging transmission and receiving functions in the minimum TXOP, intervals, where the minimum TXOP interval is equal to the inter-TXOP interval minus the TXOP jitter.

Figure 6:
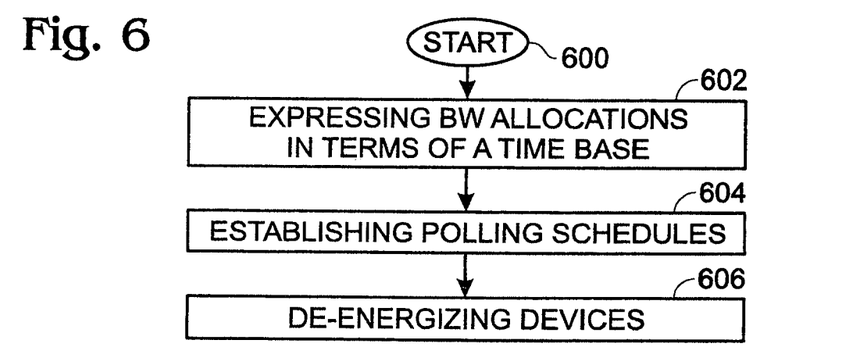
FIG. 6 is a flowchart illustrating the present invention method for saving portable device power in a wireless local area network (wLAN).

FIG. 6 is a flowchart illustrating the present invention method for saving portable device power in a wireless local area network (wLAN). The method starts at Step 600. Step 602 expresses device bandwidth allocations in terms of a time base. Step 604, in response to expressing the bandwidth allocation in terms of a time base, establishes polling schedules. Step 606 de-energizes devices in response to the polling schedules.

Figure 7:
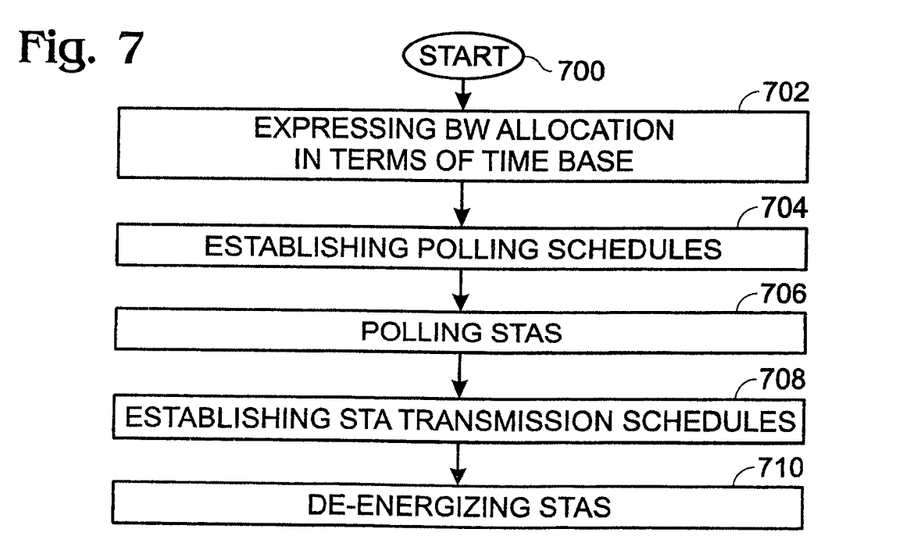
FIG. 7 is a flowchart illustrating another aspect of the present invention method for saving portable device power in a wLAN.

FIG. 7 is a flowchart illustrating another aspect of the present invention method for saving portable device power in a wLAN. The method starts at Step 700. Step 702 expresses device bandwidth allocations in terms of a time base. Step 704, in response to expressing the bandwidth allocation in terms of a time base, establishes polling schedules. Step 706 polls the STAs in response to the polling schedules. Step 708, in response to expressing the bandwidth allocation in terms of a time base, establishes station (STA) transmission schedules. That is, the STA transmission schedules are established in response to the polling. The TXOP durations can be derived from the TSPEC fields (Step 702) and the polling events (Step 706). Step 710 de-energizes STAs in response to the transmission schedules.

A system and method have been presented for controlling bandwidth allocations and saving power in a wLAN using a time-based TSPEC fields. Some examples have been used to illustrate concepts, however, the present invention is not limited to merely these examples. Although the present invention has been described in the context of a 802.11 wireless LAN system, it is equally applicable to any other CSMA based system, in particular, power line communications. Other variations and embodiments of the invention will occur to those skilled in the art.

We claim:

1. In a wireless local area network (wLAN), a method for controlling bandwidth allocation, the method comprising:
    expressing device bandwidth allocations in terms of a time base by establishing;
        an inter-transmission opportunity (TXOP) interval; and,
        a TXOP jitter;
    in response to expressing the bandwidth allocation in terms of a time base, monitoring network communications; and,
    measuring the allocated bandwidths.

2. The method of claim 1 further comprising:
    in response to expressing the bandwidth allocation in terms of a time base, establishing polling schedules; and,
    de-energizing devices in response to the polling schedules.

3. The method of claim 1 wherein establishing an inter-TXOP interval and a TXOP jitter includes establishing a transmit specification (TSPEC) communication with inter-TXOP interval and a TXOP jitter fields.

4. The method of claim 3 wherein expressing device bandwidth allocations in terms of a time base includes establishing a TSPEC communication with fields including:
    a minimum TXOP duration;
    a nominal TXOP duration; and,
    a maximum TXOP duration.

5. The method of claim 4 wherein expressing device bandwidth allocations in terms of a time base includes:
    a first station (STA) requesting permission to communicate traffic information at a second bandwidth, with a second STA, where the second bandwidth is defined as a first desired bandwidth plus a surplus bandwidth allowance;
    a hybrid controller (HC) relaying the request to the second STA;
    the second STA transmitting a response, including a first STA allocation to communicate with the second STA at the second bandwidth;
    the HC relaying the response to the first STA; and,
    the method further comprising:
    the first STA transmitting traffic information to the second STA through a wireless medium at the second bandwidth.

6. The method of claim 5 wherein establishing polling schedules in response to expressing the bandwidth allocation in terms of a time base includes:
    the HC establishing a polling schedule; and,
    in response to the polling schedule, the HC sending a poll to the first STA; and,
    wherein the first STA transmitting traffic information to the second STA through a wireless medium at the second bandwidth includes the first STA transmitting in the TXOP durations derived from the TSPEC.

7. The method of claim 6 wherein monitoring network communications in response to expressing the bandwidth allocation in terms of a time base includes the HC monitoring first STA traffic channel TXOP durations, the PHY data rate within the TXOPs, and the intervals between TXOPs; and,
    wherein measuring the allocated bandwidths includes the HC calculating the ratio of transmitted bits (TXOP duration×PHY data rate) to TXOP intervals for the first STA.

8. The method of claim 7 wherein de energizing devices in response to the polling schedule includes de-energizing devices in the TXOP intervals between polling events; and,
    the method further comprising:
    saving device power in response to deenergizing the devices.

9. The method of claim 8 wherein de-energizing the devices in the TXOP intervals between polling events includes the first STA disengaging transmission and receiving functions in the minimum TXOP intervals, where the minimum TXOP interval is equal to the inter-TXOP interval minus the TXOP jitter.

10. In a wireless local area network (wLAN), a method for saving portable device power, the method comprising:
    expressing device bandwidth allocations in terms of a time base;
    in response to expressing the bandwidth allocation in terms of a time base, establishing polling schedules, an inter-transmission opportunity (TXOP) interval, and a TXOP jitter; and,
    de-energizing devices in response to the polling schedules.

11. In wireless local area network (wLAN) system for controlling bandwidth allocation, the system comprising:
    at least one station (STA), each STA having a wireless port to communicate information in a bandwidth allocation expressed in terms of a time base having an inter-transmission opportunity (TXOP) interval and a TXOP jitter; and,
    a hybrid coordinator (HC) having a wireless communications port to monitor the STA communications and measure the allocated STA bandwidths.

12. The system of claim 11 wherein the HC establishes and polls a communicating STA using polling schedules responsive to the time-based bandwidth allocation; and,
    wherein the communicating STA de-energizes devices in response to the polling schedules.

13. The system of claim 11 wherein the STA communicates in a time base having an inter-TXOP interval a TXOP jitter, in response to receiving a transmit specification (TSPEC) communication with inter-TXOP and TXOP jitter fields.

14. The system of claim 13 wherein the STA receives a TSPEC communication with a minimum TXOP duration field, a nominal TXOP duration field, and a maximum TXOP duration field.

15. The system of claim 14 further comprising:
    a first station (STA) with a wireless communications port requesting permission to communicate traffic information at a second bandwidth, where the second bandwidth is defined as a first desired bandwidth plus a surplus bandwidth allowance;
    wherein the HC includes a second STA with a station management entity (SME), the HC relaying the request from the first STA to the second station SME, the second STA SME transmitting a response to the first STA via the HC, including an allocation to communicate with the second STA at the second bandwidth; and, wherein the first STA transmits traffic information to the second STA at the second bandwidth.

16. The system of claim 15 wherein the HC, in response to establishing a polling schedule, sends a poll to the first STA; and, wherein the first STA transmits in the TXOP durations derived from the TSPEC.

17. The system of claim 16 wherein the HC monitors first STA traffic channel TXOP durations, the PHY data rate within the TXOPs, and the intervals between TXOPs, and measures the allocated bandwidth by calculating the ratio of transmitted bits (TXOP duration×PHY data rate) to TXOP intervals.

18. The system of claim 17 wherein the first STA de-energizes in the TXOP intervals between polling events, and saves power in response to de-energizing.

19. The system of claim 18 wherein the first STA disengages transmission and receiver functions in the minimum TXOP intervals, where the minimum TXOP interval is equal to the inter-TXOP interval minus the TXOP jitter.

20. A wireless local area network (wLAN) system for saving portable device power, the system comprising:

a hybrid coordinator (HC) having a wireless communications port for polling using polling schedules established in response to a time-based bandwidth allocation having an inter-transmission opportunity (TXOP) interval and a TXOP jitter; and, at least one station (STA), each STA having a wireless port to communicate information in the allocated bandwidth and de-energizing transmission and receiver functions in response to the polling schedules.

* * * * *